United States Patent
Han et al.

(10) Patent No.: US 10,616,621 B2
(45) Date of Patent: Apr. 7, 2020

(54) METHODS AND DEVICES FOR DETERMINING MULTIPATH ROUTING FOR PANORAMIC VIDEO CONTENT

(71) Applicants: AT&T Intellectual Property I, L.P., Atlanta, GA (US); The Trustees of Indiana University, Bloomington, IN (US)

(72) Inventors: Bo Han, Bridgewater, NJ (US); Vijay Gopalakrishnan, Edison, NJ (US); Feng Qian, Bloomington, IN (US); Matteo Varvello, Holmdel, NJ (US)

(73) Assignees: AT&T Intellectual Property I, L.P., Atlanta, GA (US); THE TRUSTEES OF INDIANA UNIVERSITY, Bloomington, IN (US)

( * ) Notice: Subject to any disclaimer, the term of this patent is extended or adjusted under 35 U.S.C. 154(b) by 0 days.

(21) Appl. No.: 16/023,095

(22) Filed: Jun. 29, 2018

(65) Prior Publication Data
US 2020/0007905 A1    Jan. 2, 2020

(51) Int. Cl.
*H04N 21/2385* (2011.01)
*H04N 21/234* (2011.01)
(Continued)

(52) U.S. Cl.
CPC ........... *H04N 21/2385* (2013.01); *G06F 9/54* (2013.01); *H04L 41/0803* (2013.01);
(Continued)

(58) Field of Classification Search
CPC ......... H04N 21/2385; H04N 21/23418; H04N 21/2393; H04N 21/262; H04N 21/44008;
(Continued)

(56) References Cited

U.S. PATENT DOCUMENTS 6,665,002 B2   12/2003  Liu
7,428,022 B2    9/2008  Teichner et al.
(Continued)

FOREIGN PATENT DOCUMENTS

CN    106919248 A     7/2017
GB      2538531 A    11/2016
(Continued)

OTHER PUBLICATIONS

"360 Degree Video Streaming Over Next-Gen Communication Networks", NYU Wireless, wireless.engineering.nyu.edu, Apr. 7, 2017.
(Continued)

*Primary Examiner* — Randy A Flynn
(74) *Attorney, Agent, or Firm* — Guntin & Gust, PLC; John G. Rauch

(57) ABSTRACT

Aspects of the subject disclosure may include embodiments receiving a request for portions of video content identifying first packets associated with FoV tiles and second packets associated with OOS tiles for the video content in response to receiving the request. Further embodiments include selecting a first and second communication network to transmit the first and second packets, respectively and configuring a socket API for a MPTCP for a device that includes identifying that the first packets are associated with the FoV tiles, a high priority, and are to be transmitted over the first communication network, and the socket API includes identifying that the second packets are associated with the OOS tiles, a low priority, and are to be transmitted over the second communication network. Additional embodiments include transmitting the first and second packets over the first and second communication network, respectively, using MPTCP. Other embodiments are disclosed.

20 Claims, 13 Drawing Sheets

(51) Int. Cl.

| | | |
|---|---|---|
| *H04N 21/239* | (2011.01) | |
| *H04N 21/262* | (2011.01) | |
| *H04N 21/44* | (2011.01) | |
| *H04N 21/643* | (2011.01) | |
| *H04N 21/81* | (2011.01) | |
| *H04L 12/24* | (2006.01) | |
| *H04L 12/707* | (2013.01) | |
| *G06F 9/54* | (2006.01) | |

(52) U.S. Cl.
CPC ......... *H04L 45/24* (2013.01); *H04N 21/2393* (2013.01); *H04N 21/23418* (2013.01); *H04N 21/262* (2013.01); *H04N 21/44008* (2013.01); *H04N 21/643* (2013.01); *H04N 21/816* (2013.01)

(58) Field of Classification Search
CPC ...... H04N 21/643; H04N 21/816; G06F 9/54; H04L 41/0803; H04L 45/24
See application file for complete search history.

(56) References Cited

U.S. PATENT DOCUMENTS

| | | | |
|---|---|---|---|
| 7,817,181 | B2 | 10/2010 | Lee |
| 8,379,670 | B2 | 2/2013 | Le Floch et al. |
| 8,947,498 | B2 | 2/2015 | Wang |
| 9,131,257 | B2 | 9/2015 | Russo et al. |
| 9,392,102 | B2 | 7/2016 | Zhou |
| 9,589,255 | B1 | 3/2017 | Sandrew |
| 9,589,434 | B2 | 3/2017 | Siann et al. |
| 9,621,871 | B2 | 4/2017 | Toma et al. |
| 9,635,252 | B2 | 4/2017 | Accardo et al. |
| 9,648,318 | B2 | 5/2017 | Li et al. |
| 9,686,520 | B2 | 6/2017 | Degtyarev et al. |
| 9,699,437 | B2 | 7/2017 | Cole et al. |
| 9,710,973 | B2 | 7/2017 | Bar-Zeev et al. |
| 9,787,896 | B2 | 10/2017 | Fink et al. |
| 9,813,465 | B2 | 11/2017 | Petria et al. |
| 9,813,673 | B2 | 11/2017 | Smits |
| 9,847,079 | B2 | 12/2017 | Clement et al. |
| 9,897,807 | B2 | 2/2018 | Giokaris et al. |
| 9,912,717 | B2 | 3/2018 | Ha et al. |
| 9,918,136 | B2 | 3/2018 | Cole et al. |
| 9,929,879 | B2 | 3/2018 | Herrero |
| 2003/0233464 | A1 | 12/2003 | Walpole et al. |
| 2007/0019740 | A1 | 1/2007 | Budagavi et al. |
| 2011/0069147 | A1 | 3/2011 | Lin et al. |
| 2011/0216833 | A1 | 9/2011 | Chen et al. |
| 2012/0291080 | A1 | 11/2012 | Mccutchen et al. |
| 2014/0013361 | A1 | 1/2014 | Monari et al. |
| 2014/0247324 | A1 | 9/2014 | Cury et al. |
| 2014/0313989 | A1* | 10/2014 | Doken ............. H04N 21/64769 370/329 |
| 2015/0023430 | A1 | 1/2015 | Choi et al. |
| 2015/0063211 | A1* | 3/2015 | Kim .................. H04L 45/24 370/328 |
| 2015/0271493 | A1 | 9/2015 | Okazaki |
| 2015/0346812 | A1* | 12/2015 | Cole .................. H04N 21/482 345/156 |
| 2016/0027141 | A1 | 1/2016 | Patel et al. |
| 2016/0073023 | A1 | 3/2016 | Rondinelli et al. |
| 2016/0100332 | A1* | 4/2016 | Yi .................. H04L 67/26 370/338 |
| 2016/0150212 | A1 | 5/2016 | Moura et al. |
| 2016/0260196 | A1 | 9/2016 | Roimela et al. |
| 2016/0277772 | A1* | 9/2016 | Campbell ........ H04N 21/21805 |
| 2016/0286251 | A1* | 9/2016 | Kopka ............. H04N 21/23406 |
| 2016/0352791 | A1 | 12/2016 | Adams et al. |
| 2016/0360180 | A1 | 12/2016 | Cole et al. |
| 2016/0373725 | A1 | 12/2016 | Pastor |
| 2017/0078351 | A1 | 3/2017 | Von Sneidern et al. |
| 2017/0078921 | A1* | 3/2017 | Xia ................ H04W 28/08 |
| 2017/0085484 | A1* | 3/2017 | Hellander ........... H04L 69/14 |
| 2017/0094261 | A1 | 3/2017 | Teslenko |
| 2017/0115488 | A1 | 4/2017 | Ambrus et al. |
| 2017/0126416 | A1 | 5/2017 | Mccormick et al. |
| 2017/0188058 | A1 | 6/2017 | Nakashima et al. |
| 2017/0220816 | A1 | 8/2017 | Matusek et al. |
| 2017/0244948 | A1 | 8/2017 | Pang et al. |
| 2017/0251204 | A1 | 8/2017 | Gupte et al. |
| 2017/0289219 | A1 | 10/2017 | Khalid et al. |
| 2017/0316543 | A1 | 11/2017 | Pieters |
| 2017/0318126 | A1 | 11/2017 | Breitenfeld et al. |
| 2017/0332117 | A1 | 11/2017 | Haritaoglu et al. |
| 2017/0336705 | A1 | 11/2017 | Zhou et al. |
| 2017/0339391 | A1 | 11/2017 | Zhou et al. |
| 2017/0339415 | A1 | 11/2017 | Wang et al. |
| 2017/0344843 | A1 | 11/2017 | Wang et al. |
| 2017/0347026 | A1 | 11/2017 | Hannuksela |
| 2017/0347084 | A1 | 11/2017 | Boyce |
| 2017/0352191 | A1 | 12/2017 | Zhou |
| 2017/0359586 | A1 | 12/2017 | Xue et al. |
| 2017/0374127 | A1 | 12/2017 | Hosur |
| 2017/0374375 | A1 | 12/2017 | Makar et al. |
| 2017/0374411 | A1 | 12/2017 | Lederer et al. |
| 2018/0020204 | A1 | 1/2018 | Pang et al. |
| 2018/0027258 | A1 | 1/2018 | Tech et al. |
| 2018/0035134 | A1 | 2/2018 | Pang et al. |
| 2018/0130323 | A1 | 5/2018 | Zhang |
| 2018/0146216 | A1 | 5/2018 | Chang et al. |
| 2018/0191868 | A1* | 7/2018 | Wang ............. H04N 21/234381 |
| 2018/0191952 | A1 | 7/2018 | Ardo et al. |
| 2018/0359189 | A1* | 12/2018 | Ye .................. H04N 21/00 |

FOREIGN PATENT DOCUMENTS

| | | |
|---|---|---|
| KR | 101808639 B1 | 1/2018 |
| WO | 9321703 A1 | 10/1993 |
| WO | 9742601 A1 | 11/1997 |
| WO | 2015183887 A1 | 12/2015 |
| WO | 2016058279 A1 | 4/2016 |
| WO | 2017093611 A1 | 6/2017 |
| WO | 2017140945 A1 | 8/2017 |
| WO | 2017140948 A1 | 8/2017 |
| WO | 2017205642 A1 | 11/2017 |
| WO | 2017205794 | 11/2017 |
| WO | 2018004239 A1 | 1/2018 |
| WO | 2018011054 A1 | 1/2018 |
| WO | 2018041244 | 3/2018 |
| WO | 2018049221 | 3/2018 |

OTHER PUBLICATIONS

Farr, Kieran, "Using Microservices and Containers for Video Encoding", bitmovin.com, Mar. 23, 2018.

Hosseini, et al., "Adaptive 360 VR video streaming based on MPEG-DASH SRD", Multimedia (ISM), 2016 IEEE International Symposium, IEEE, 2016, 2 pages.

Hosseini, et al., "Adaptive 360 VR video streaming: Divide and conquer", Multimedia (ISM), 2016 IEEE International Symposium, IEEE, 2016, 6 pages.

Inoue, Masayuki et al., "Interactive Panoramic Video Streaming System over Restricted Bandwidth Network", Proceedings of the 18th ACM international conference on Multimedia. ACM, 2010., 2010, 4 pages.

Li, Jiwei et al., "Smartphone-Assisted Smooth Live Video Broadcast on Wearable Cameras", Quality of Service (IWQoS), 2016 IEEE/ACM 24th International Symposium, IEEE, 2016., 2016, 6 pages.

Liu, et al., "360 Innovations for Panoramic Video Streaming", Proceedings of the 16th ACM Workshop on Hot Topics in Networks, ACM, 2017, 7 pages.

Liu, Xing et al., "360° Innovations for Panoramic Video Streaming", Proceedings of the 16th ACM Workshop on Hot Topics in Networks. ACM, 2017., 2017, 7 pages.

Nasrabadi, et al., "Adaptive 360-Degree Video Streaming using Scalable Video Coding", Proceedings of the 2017 ACM on Multimedia Conference, ACM, 2017, 9 pages.

(56) References Cited

OTHER PUBLICATIONS

Nasrabadi, Afshin T., "Adaptive 360-Degree Video Streaming using Layered Video Coding", IEEE Virtual Reality, Mar. 18-22, 2017, 347-348.

Ng, Kinig-To et al., "Data Compression and Transmission Aspects of Panoramic Videos", IEEE Transactions on Circuits and Systems for Video Technology 15.1 (2005): 82-95., Jan. 2005, 15 pages.

Toni, Laura et al., "Interactive Free Viewpoint Video Streaming Using Prioritized Network Coding", Multimedia Signal Processing (MMSP), 2013 IEEE 15th International Workshop, IEEE, 2013., Sep. 30, 2013, 6 pages.

Wang, "LIAITHON: A location-aware multipath video streaming scheme for urban vehicular networks", Computers and Communications (ISCC), 2012 IEEE Symposium, IEEE, 2012, 6 pages.

Wu, Po-Han et al., "Video-Quality-Driven Resource Allocation for Real-Time Surveillance Video Uplinking Over OFDMA-Based Wireless Networks", IEEE Transactions on Vehicular Technology 64.7 (2015): 3233-3246., Jul. 2015, 14 pages.

Zhao, et al., "SDN-Assisted adaptive streaming framework for tile-based immersive content using MPEG-DASH", Network Function Virtualization and Software Defined Networks (NFV-SDN), 2017 IEEE Conference, 6 pages.

Afzal, Shahryar et al., "Characterization of 360-degree Videos", VR/AR Network '17, Aug. 25, 2017, Los Angeles, CA, USA, Association for Computing Machinery, ACM ISBN 978-1-4503-5055—Jun. 17, 2008, 6 pages.

Bao, Yanan et al., "Motion-Prediction-Based Multicast for 360-Degree Video Transmissions", IEEE, 2017 14th Annual IEEE International Conference on Sensing, Communication, and Networking (SECON), At San Diego, CA, USA, Jun. 2017, 9 pages.

Bao, Yanan, "Shooting a Moving Target: Motion-Prediction-Based Transmission for 360-Degree Videos", 2016 IEEE International Conference on Big Data, Dec. 2016, 10 pages.

Boos, Kevin et al., "FlashBack: Inmiersive Virtual Reality on Mobile Devices via Rendering Memoization", MobiSys'16, Jun. 25-30, 2016, Singapore, Singapore ACM. ISBN 978-1-4503-4269, 13 pages.

Budagavi, Madhukar et al., "360 Degrees Video Coding Using Region Adaptive Smoothing", 2015 IEEE, Samsung Research America, Dallas Northwestern University, Evanston, IL, Sep. 2015, 5 pages.

Corbillon, et al., "Optimal Set of 360-Degree Videos for Viewport-Adaptive Streaming", MM '17, Oct. 23-27, 2017, Mountain View, CA, 9 pages.

Corbillon, et al., "Viewport-Adaptive Navigable 360-Degree Video Delivery", 2017 IEEE International Conference on Communications, May 2017, 7 pages.

Corbillon, Xavier et al., "360-degree video head movement dataset", Proceedings of the 8th ACM on Multimedia Systems Conference, ACM, Jun. 2017, 6 pages.

De Cock, Jan et al., "A Large-Scale Video Codec Comparison of x264, x265 and libvpx for Practical VOD Applications", Applications of Digital Image Processing XXXIX, Sep. 2016, 17 pages.

Duanmu, Fanyi et al., "Prioritized Buffer Control in Two-tier 360 Video Streaming", In Proceedings of VR/AR Network '17, Los Angeles, CA, USA, Aug. 25, 2017, 6 pages.

Fan, Ching-Ling et al., "Fixation Prediction for 360 Video Streaming in Head-Mounted Virtual Reality", In Proceedings of NOSSDAV'17, Taipei, Taiwan, Jun. 20-23, 2017, 6 pages, Jun. 20, 2017, 6 pages.

Gaddam, Vamsidhar et al., "Tiling in Interactive Panoramic Video: Approaches and Evaluation", IEEE Transactions on Multimedia, vol. 18, No. 9, Sep. 2016, 13 pages.

Graf, Mario et al., "Towards bandwidth efficient adaptive streaming of omnidirectional video over http: Design, implementation, and evaluation", Proceedings of the 8th ACM on Multimedia Systems Conference, ACM, Jun. 2017, 11 pages.

Hamza, Ahmed et al., "Adaptive Streaming of Interactive Free Viewpoint Videos to Heterogeneous Clients", MMSys '16, May 10-13, Klagenfurt, Austria, ACM, ISBN 978-1-4503-4297, 12 pages.

Hosseini, et al., "Adaptive 360 VR Video Streaming: Divide and Conquer", 2016 IEEE International Symposium, Dec. 2016, 4 pages.

Huang, Te-Yuan et al., "A Buffer-Based Approach to Rate Adaptation: Evidence from a Large Video Streaming Service", SIGCOMM'14, Aug. 17-22, 2014, Chicago, Illinois, 12 pages.

Jiang, Junchen et al., "Improving Fairness, Efficiency, and Stability in HTTP-based Adaptive Video Streaming with FESTIVE", CoNEXT'12, Dec. 10-13, 2012, Nice, France, pp. 97-108.

Ju, Ran et al., "Ultra Wide View Based Panoramic VR Streaming", In Proceedings of VR/AR Network '17, Los Angeles, CA, USA, Aug. 25, 2017, 5 pages.

Kammachi-Sreedhar, Kashyap et al., "Viewport-adaptive Encoding and Streaming of 360-degree Video for Virtual Reality Applications", 2016 IEEE International Symposium on Multimedia, Dec. 2016, 4 pages.

Lai, Zeqi et al., "Furion: Engineering High-Quality Immersive Virtual Reality on Today's Mobile Devices", MobiCom'17, Oct. 16-20, 2017, Snowbird, UT, USA.Association for Computing Machinery. ACM ISBN 978-1-4503-4916—Jan. 17, 2010, 13 pages.

Le Feuvre, Jean et al., "Tiled-based Adaptive Streaming using MPEG-DASH", MMSys'16, May 10-13, 2016, Klagenfurt, 3 pages.

Li, Tianxing et al., "Ultra-Low Power Gaze Tracking for Virtual Reality", SenSys '17, Nov. 6-8, 2017, Netherlands, 14 pages.

Lo, Wen-Chin et al., "360 Video Viewing Dataset in Head-Mounted Virtual Reality", 2017 ACM, Jun. 2017, 6 pages.

Mangiante, Simone et al., VR is on the Edge: How to Deliver 360 degrees Videos in Mobile Networks; Conference: the Workshop, researchgate.net, DOI: 10.1145/3097895.3097901, (Aug. 2017), pp. 1-18.

Mao, Hongzi et al., "Neural Adaptive Video Streaming with Pensieve," SIGCOMM '17, Los Angeles, CA, USA, Aug. 21, 2017, 14 pages.

Nasrabadi, et al., "Adaptive 360-Degree Video Streaming using Scalable Video Coding", MM '17, Oct. 2017, Mountain View, CA, ISBN 978-1-4503-4909, 9 pages.

Ochi, Daisuke et al., "HMD Viewing Spherical Video Streaming System", MM'14, Nov. 3-7, 2014, Orlando, Florida, USA., Nov. 3, 2014, 2 pages.

Ochi, Daisuke et al., "Live Streaming System for Omnidirectional Video", IEEE Virtual Reality Conference, Aires, France, Mar. 23, 2015, 2 pages.

Petrangeli, Stefano et al., "An HTTP/2-Based Adaptive Streaming Framework for 360 Virtual Reality Videos", Proceedings of the 2017 ACM on Multimedia Conference, ACM, 2017, Oct. 23-27, 2017, 9 pages.

Qian, Feng et al., "Optimizing 360 Video Delivery Over Cellular Networks", Proceedings of the 5th Workshop on All Things Cellular: Operations, Applications and Challenges, ACM, 2016, Oct. 3-7, 2016, 6 pages.

Rai, Yashas et al., "A Dataset of Head and Eye Movements for 360 Degree Images", MMSys'17, Taipei, Taiwan; 2017 ACM., Sep. 2017, 6 pages.

Sanchez, Yago et al., "Spatia-Temporal Activity based Tiling for Panorama Streaming", NOSSDAV'17, Jun. 20-23, 2017, Taipei, Taiwan., 6 pages.

Van Den Broeck, Marc et al., "It's All Around You: Exploring 360 Video Viewing Experiences on Mobile Devices", MM'17, Oct. 23-27, 2017, Mountain View, CA, USA, 2017, 7 pages.

Wang, Hui et al., "Mixing Tile Resolutions in Tiled Video: A Perceptual Quality Assessment", NOSSDAV'14, Mar. 19-21, 2014, Singapore, Singapore, Mar. 19, 2014, 6 pages.

Wu, Chenglei et al., "A Dataset for Exploring User Behaviors in VR Spherical Video Streaming", MMSys'17, Taipei, Taiwan; Jun. 2017 ACM, 2017, 6 pages.

Xiao, et al., "OpTile: Toward Optimal Tiling in 360-degree Video Streaming", In Proceedings of MM '17, Mountain View, CA, USA, Oct. 23-27, 2017, 9 pages.

Xie, Lan et al., "360ProbDASH: Improving QoE of 360 Video Streaming Using Tile-based HTTP Adaptive Streaming", 2017 Association for Computing Machinery, Oct. 2017, 9 pages.

Xie, Xiufeng et al., "POI360: Panoramic Mobile Video Telephony over LTE Cellular Networks", CoNEXT '17, Dec. 12-15, 2017, Incheon, Republic of Korea, 2017, 14 pages.

(56) References Cited

OTHER PUBLICATIONS

Yin, Xiaoqi et al., "A Control-Theoretic Approach for Dynamic Adaptive Video Streaming over HTTP", SIGCOMM '15, Aug. 17-21, 2015, London, United Kingdom; 2015 ACM, 2015, 14 pages.

Yu, Matt et al., "A Framework to Evaluate Omnidirectional Video Coding Schemes", 2015 IEEE International Symposium on Mixed and Augmented Reality, Sep. 29-Oct. 3, 2015, 6 pages.

Zare, Alireza et al., "HEVC-compliant Tile-based Streaming of Panoramic Video for Virtual Reality Applications", MM '16, Oct. 15-19, 2016, Amsterdam, Netherlands, Oct. 15, 2016, 5 pages.

Zhou, Chao, "A Measurement Study of Oculus 360 Degree Video Streaming", MMSys'17, Jun. 20-23, 2017, Taipei, Taiwan, 11 pages.

\* cited by examiner

240

| Priority | Spatial | Temporal |
|---|---|---|
| High | FoV chunks | urgent chunks |
| Low | OOS chunks | regular chunks |

FIG. 2H

METHODS AND DEVICES FOR DETERMINING MULTIPATH ROUTING FOR PANORAMIC VIDEO CONTENT

FIELD OF THE DISCLOSURE

The subject disclosure relates to methods and devices for determining multipath routing for panoramic video content.

BACKGROUND

Panoramic video content can be provided by video content servers to client devices that can include mobile devices over communication networks. In some environments, a mobile device can be coupled to a virtual headset to display the panoramic video content.

BRIEF DESCRIPTION OF THE DRAWINGS

Reference will now be made to the accompanying drawings, which are not necessarily drawn to scale, and wherein:

FIGS. 2F-2H depict embodiments of systems for multipath streaming of video content.

DETAILED DESCRIPTION

Figure 1:
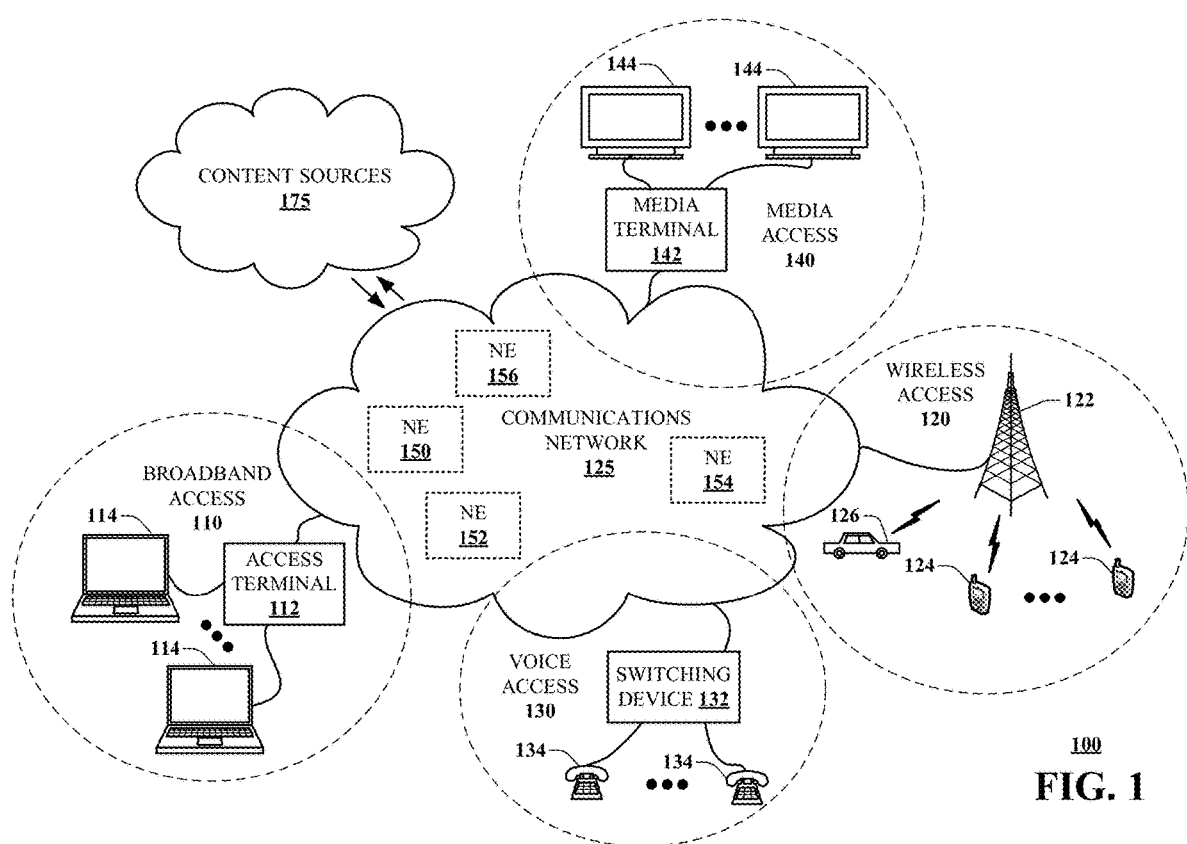
FIG. 1 is a block diagram illustrating an example, non-limiting embodiment of a communications network in accordance with various aspects described herein.

The subject disclosure describes, among other things, illustrative embodiments for receiving a request for a plurality of portions of video content, identifying a first group of packets associated with field of view (FoV) tiles for the video content in response to receiving the request, and identifying a second group of packets associated with out of sight (OOS) tiles for the video content in response to receiving the request. Further embodiments can include selecting a first communication network to transmit the first group of packets, and selecting a second communication network to transmit the second group of packets. Additional embodiments can include configuring a socket application programming interface (API) for a Multipath Transmission Control Protocol (MPTCP) for the device, wherein the configuring of the socket API includes identifying that the first group of packets are associated with the FoV tiles, associated with a high priority, and are to be transmitted over the first communication network. Configuring of the socket API includes identifying that the second group of packets are associated with the OOS tiles, associated with a low priority, and are to be transmitted over the second communication network. Also, embodiments can include transmitting the first group of packets over the first communication network using MPTCP, and transmitting the second group of packets over the second communication network using MPTCP. Other embodiments are described in the subject disclosure.

One or more aspects of the subject disclosure include a device. The device comprising a processing system including a processor, and a memory that stores executable instructions that, when executed by the processing system, facilitate performance of operations. The operations comprising receiving a request for a plurality of portions of video content, identifying a first group of packets associated with field of view (FoV) tiles for the video content in response to receiving the request, and identifying a second group of packets associated with out of sight (OOS) tiles for the video content in response to receiving the request. Further operations can include selecting a first communication network to transmit the first group of packets, and selecting a second communication network to transmit the second group of packets. Additional operations can include configuring a socket application programming interface (API) for a Multipath Transmission Control Protocol (MPTCP) for the device. Configuring of the socket API includes identifying that the first group of packets are associated with the FoV tiles, associated with a high priority, and are to be transmitted over the first communication network. Configuring of the socket API includes identifying that the second group of packets are associated with the OOS tiles, associated with a low priority, and are to be transmitted over the second communication network. Also, operations can include transmitting the first group of packets over the first communication network using MPTCP, and transmitting the second group of packets over the second communication network using MPTCP.

One or more aspects of the subject disclosure include a non-transitory, machine-readable medium, comprising executable instructions that, when executed by a processing system including a processor, facilitate performance of operations. The operations can include transmitting a request for a plurality of portions of video content to a video content server. The transmitting of the request causes the video content server to identify a first group of packets associated with field of view (FoV) tiles for the video content and identify a second group of packets associated with out of sight (OOS) tiles for the video content. The video content server configures the first group of packets to a high priority and the second group of packets to a low priority. Further operations can include receiving the first group of packets from a first communication network using a Mulitpath Transmission Control Protocol (MPTCP). The video content server selects the first communication network to transmit the first group of packets according to the high priority and that a first throughput of the first communication network is higher than a second throughput of a second communication network. The video content server configures a socket application programming interface (API) for the MPTCP for the processing system to identify that the first group of packets are associated with the FOV tiles, associated with the high priority, and are to be transmitted over the first communication network. Additional operations can include receiving the second group of packets from the second communication network using MPTCP. The video content server selects the second communication network to transmit the second group of packets according to the low priority and that the first throughput of the first communication network is higher than the second throughput of the second communication network, The video content server configures the socket API for MPTCP to identify that the second group of packets are associated with the OOS tiles, associated with the low priority, and are to be transmitted over the second communication network.

One or more aspects of the subject disclosure include a method. The method can include receiving, by a processing system including a processor, a request for a plurality of portions of video content, identifying, by the processing system, a first group of packets associated with field of view (FoV) tiles for the video content in response to receiving the request, and identifying, by the processing system, a second group of packets associated with out of sight (OOS) tiles for the video content in response to receiving the request. Further, the method can include configuring, by the processing system, the first group of packets to a high priority and configuring, by the processing system, the second group of packets to a low priority. In addition, the method can include selecting, by the processing system, a first communication network to transmit the first group of packets according to the high priority and first network conditions associated with the first communication network, and selecting, by the processing system, a second communication network to transmit the second group of packets according to the low priority and second network conditions associated with the second communication network. Also, the method can include configuring, by the processing system, a socket application programming interface (API) for a Multipath Transmission Control Protocol (MPTCP) for the device. Configuring of the socket API includes identifying that the first group of packets are associated with the FoV tiles, associated with a high priority, and are to be transmitted over the first communication network. Configuring of the socket API includes identifying that the second group of packets are associated with the OOS tiles, associated with a low priority, and are to be transmitted over the second communication network. Further, the method can include transmitting, by the processing system, the first group of packets over the first communication network using MPTCP, and transmitting, by the processing system, the second group of packets over the second communication network using MPTCP.

Referring now to FIG. 1, a block diagram is shown illustrating an example, non-limiting embodiment of a communications network 100 in accordance with various aspects described herein. Embodiments include providing multipath streaming of panoramic video content. That is, FoV tiles of the video content are configured with a high priority and OOS tiles of the video content are configured with a low priority. Further, a video content server provides packets associated with the FoV tiles to a client device that presents the video content over a first communication network and the video content server provides packets associated with the OOS tiles to the client device over a second communication network. The first communication network has network conditions such that it provides the packets associated with the FoV tiles faster than the packets associated with the OOS tiles over the second communication network.

In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
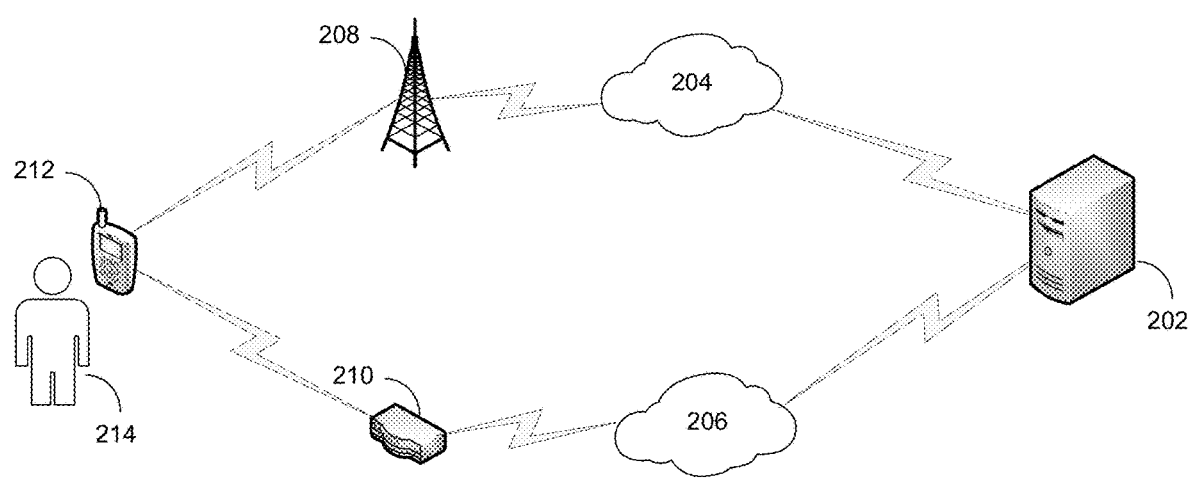
FIGS. 2A-2D is a block diagram illustrating an example, non-limiting embodiment of a system functioning within the communication network of FIG. 1 in accordance with various aspects described herein.

FIG. 2A is a block diagram illustrating an example, non-limiting embodiment of a system 200 functioning within the communication network of FIG. 1 in accordance with various aspects described herein. In one or more embodiments, the system 200 includes a video content server 202 that can provide video content to a client device 212 over a plurality of communication networks 204-206. In some embodiments, the plurality of communication networks can comprise communication networks in addition to communication networks 204-206. In other embodiments, the client device can be a mobile device such as a smartphone, tablet computer, virtual reality headset, wearable device, smartwatch, laptop computer or another computing device such as a desktop computer, television, set top box, media processor, or some other computing device, or a combination thereof. Communication network 204 can be a cellular network and communication network 206 can be a WiFi network. Other networks can carry video content from the video content server 202 can be a cable television network, a satellite television network, an IPTV network, or any other communication network that can carry media content or video content. Portions of the video content can traverse communication network 204 and other portions of the video content can traverse communication network 206. The video content can be panoramic video content that can comprise 360 degree video content or less than 360 degree video content that can be presented on a display of a virtual reality headset to a user 214.

Figure 2B:
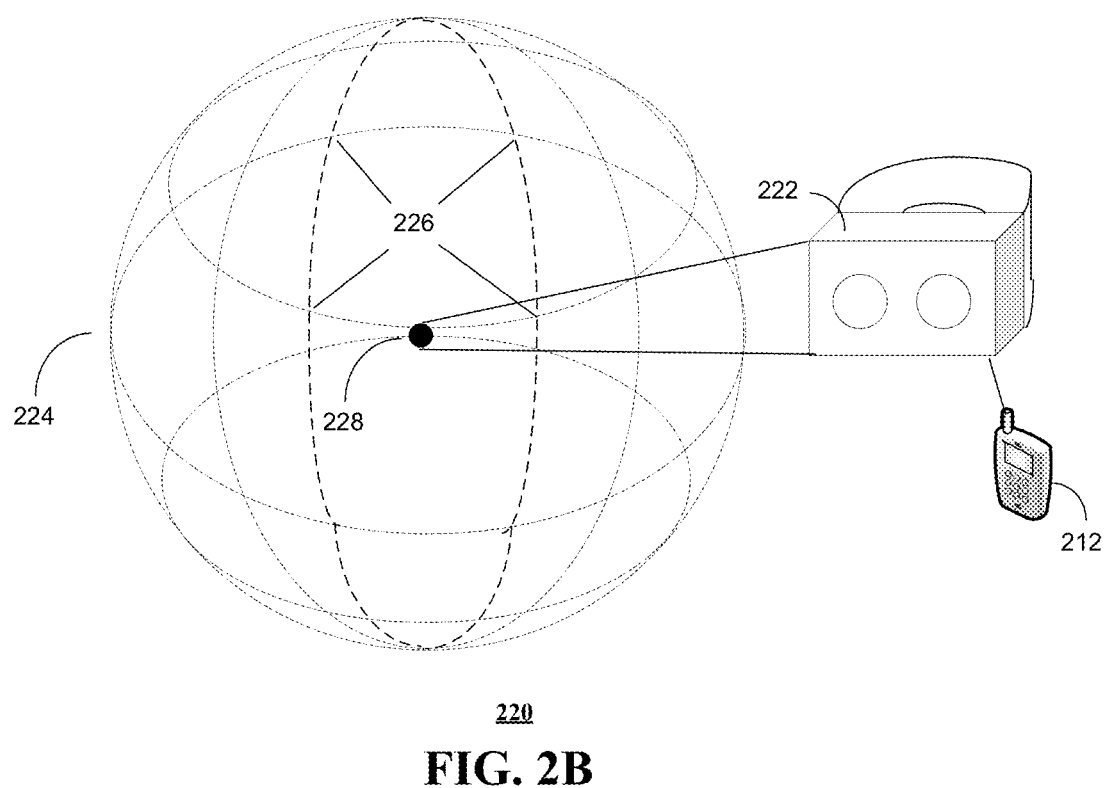

In one or more embodiments, the video content can receive a request for different portions of the video content from the client device 212. Referring to FIG. 2B, in one or more embodiments, a system 220 can include a video content server 202 that provides video content over one of a plurality communication networks 204-206 to a client device 212 communicatively coupled to a virtual reality headset 222. In some embodiments, the video content can be 360 degree video content that can be viewed or presented using the virtual reality headset 222. In further embodiments, a client device 212, such as a smartphone, can be coupled to the virtual reality headset 222 to view the 360 video content. In other embodiments, the video content can be provide by the video content server 202 over one of the plurality of communication networks to a media device communicatively coupled to a display to present the video content. In additional embodiments, the video content server 202 can be a media content server, a social media server, a gaming server, web server, or any other server that provides video content.

In one or more embodiments, 360 degree video content viewed on the display of the virtual reality headset 222 can be presented from the perspective of being at a center 228 of a sphere 224. A user 214 wearing the virtual reality headset 222 can view different perspectives of the 360 video content by moving the user's head in a particular direction. For example, if a user 214 moves her head up, then the video content is adjusted to provide the perspective toward the top of the sphere 224.

In one or more embodiments, the video content is provided by the video content server 202 into chunks or portions of video content. Further, each chunk can be segmented into tiles 226 and provided or transmitted by the video server 202 to the client device 212. The tiles can be received by a video player that is integrated with or communicatively coupled with the virtual reality headset or any display communicatively and/or physically coupled to the client device 212.

Figure 2C:
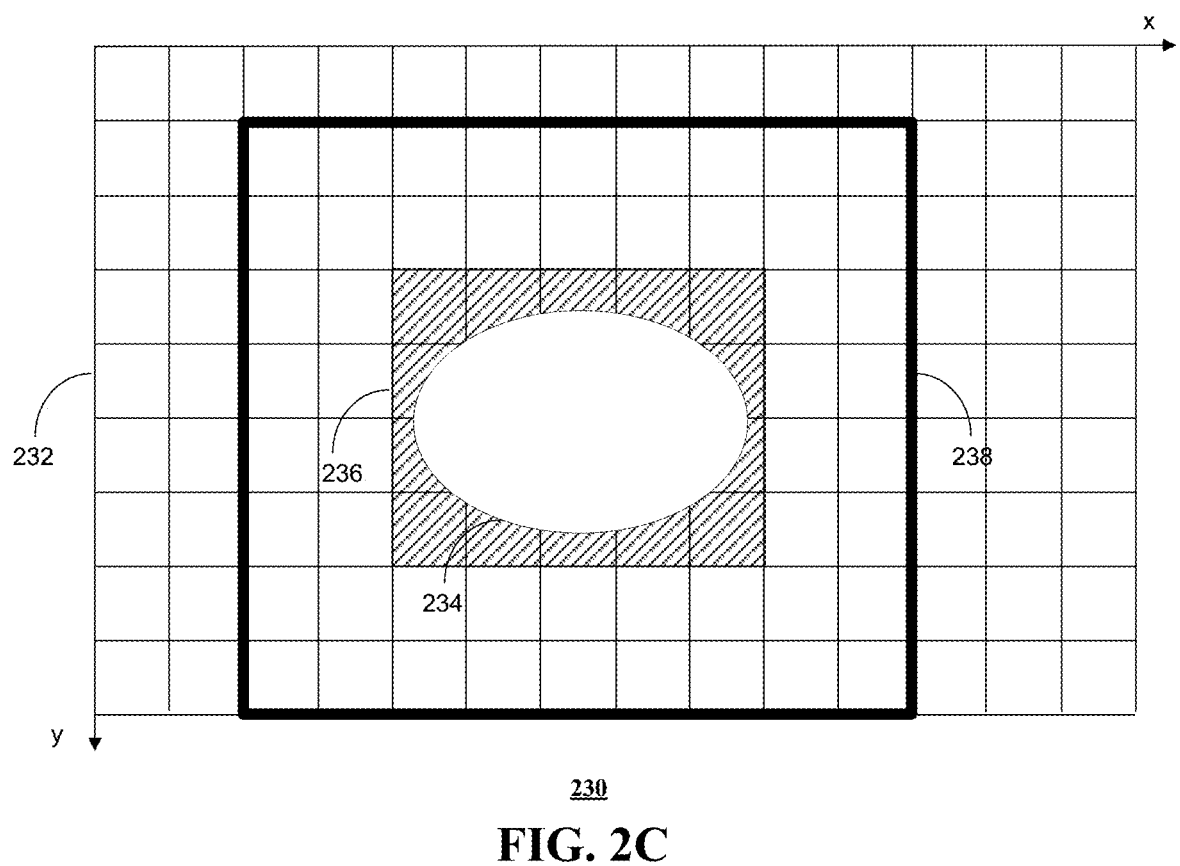

Referring to FIG. 2C, one or more embodiments of system 230, a portion of the tiles of the video content, within a first time period of playback of the video content, can be identified as FOV tiles 236 and another portion of the tiles 238 can be identified as 00S tiles. Tiles for a chunk or portion of 360 degree video content corresponding to a three dimensional perspective can be organized into a two dimensional array 232. The video player can identify the FOV 234 of the user for a particular chunk or portion of video content at a particular time.

In one or more embodiments, the FOV tiles 236 can be identified during playback of the video content on the display of a virtual reality headset. The identified FOV tiles 236 can be requested by the video player of the client device 212 from the video server 202 over one of the plurality of communication networks 204-206.

Figure 2D:
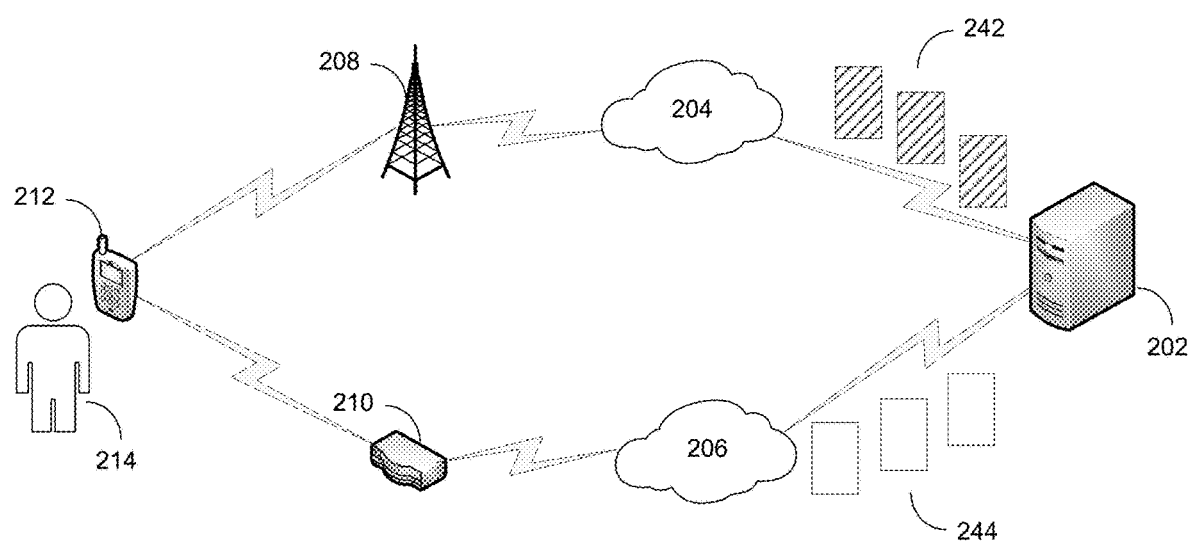

Referring to FIG. 2D, in one or more embodiments, the video content server 202 can receive a request for multiple portions of video content. In some embodiments, the receiving of the request can comprise receiving a first request for FoV tiles for a first portion of the video content and receiving a second request for the OOS tiles for a second portion of the video content. In other embodiments, the video content server 202 can identify a first group of packets associated with the FoV tiles for the video content in response (in some embodiments) to receiving the request and can identify a second group of packets associated with the OOS tiles for the video content in response to receiving the request. In further embodiments, the video content server 202 can identify a first communication network and a second communication network from multiple communication networks that are capable of transmitting the first group of packets and the second group of packets.

In one or more embodiments, the video content server 202 can select a first communication network 204 to transmit the first group of packets 242 associated with the FoV tiles to the client device 212. The communication network 204 can be a cellular network such that the first group of packets 242 can traverse the cellular network and a cell tower 208 to the client device 212. In other embodiments, the video content can select a second communication network 206 to transmit the second group of packets 244 associated with the OOS tiles to the client device 212. The communication network 206 can be a WiFi network such that the second group of packets 244 can traverse the WiFi network and a WiFi router 210 to the client device 212. The FOV tiles are portions of the video content that the user 214 is going to see when presented. However, the OOS tiles may be presented to the user 214 if the user's point of view changes in the future such that the OOS tiles become FoV tiles. Thus, FOV tiles have a more urgent priority than OOS tiles. Therefore, the video content server 202 can configure a transmission of the first group of packets to a high priority and configure a transmission of the second group of packets to a low priority.

In one or more embodiments, the video content server selects a first communication network 204 for the first group of packets associated with the FoV tiles because the first communication network 204 can provide the first group of packets to the client device 212 from the video content server 202 faster than the second communication network. In some embodiments, the video content server 202 can determine a first throughput of the first communication network 204 and can determine a second throughput of the second communication network. Further, the video content server 202 can determine the first throughput is higher than the second throughput. Therefore, the video content server 202 can select the first communication network to transmit the first group of packets and select the second communication network to transmit the second group of packets because and/or according to first throughput being higher than the second throughput.

In other embodiments, the video content server 202 can determine first network conditions for the first communication network 204 and second network conditions for the second communication network 206. First network conditions and second network conditions can include latency, available bandwidth, loss rate, throughput, jitter, congestions, network type, interference, signal to noise ratio, signal to interference ratio, or a combination thereof. The video content server 202 can select the first communication network 204 to transmit the first group of packets according to the first network conditions and/or second network conditions, and can select the second communication network 206 to transmit the second group of packets according to the first network conditions and/or second network conditions. In further embodiments, a cellular network can, at times and certain conditions, have a faster throughput than a WiFi network. Thus, the video content server 202 can determine that the first communication network 204 is of a first type (e.g. cellular network) and can determine that the second communication network is of a second type (e.g. WiFi network). Therefore, the video content server 202 can select the first communication network 204 to transmit the first group of packets according to the first network type, and can select the second communication network 206 to transmit the second group of packets according to the second network type.

In one or more embodiments, the video content server 202 can configure a socket application programming interface (API) for a Multipath Transmission Control Protocol (MPTCP) for the video content server. The configuring of the socket API includes identifying that the first group of packets are associated with the FoV tiles, associated with a high priority, and are to be transmitted over the first communication network. Further, the configuring of the socket API includes identifying that the second group of packets are associated with the OOS tiles, associated with a low priority, and are to be transmitted over the second communication network. In additional embodiments, the video content server 202 can transmit the first group of packets over the first communication network using MPTCP, and transmit the second group of packets over the second communication network using MPTCP.

Figure 2E:
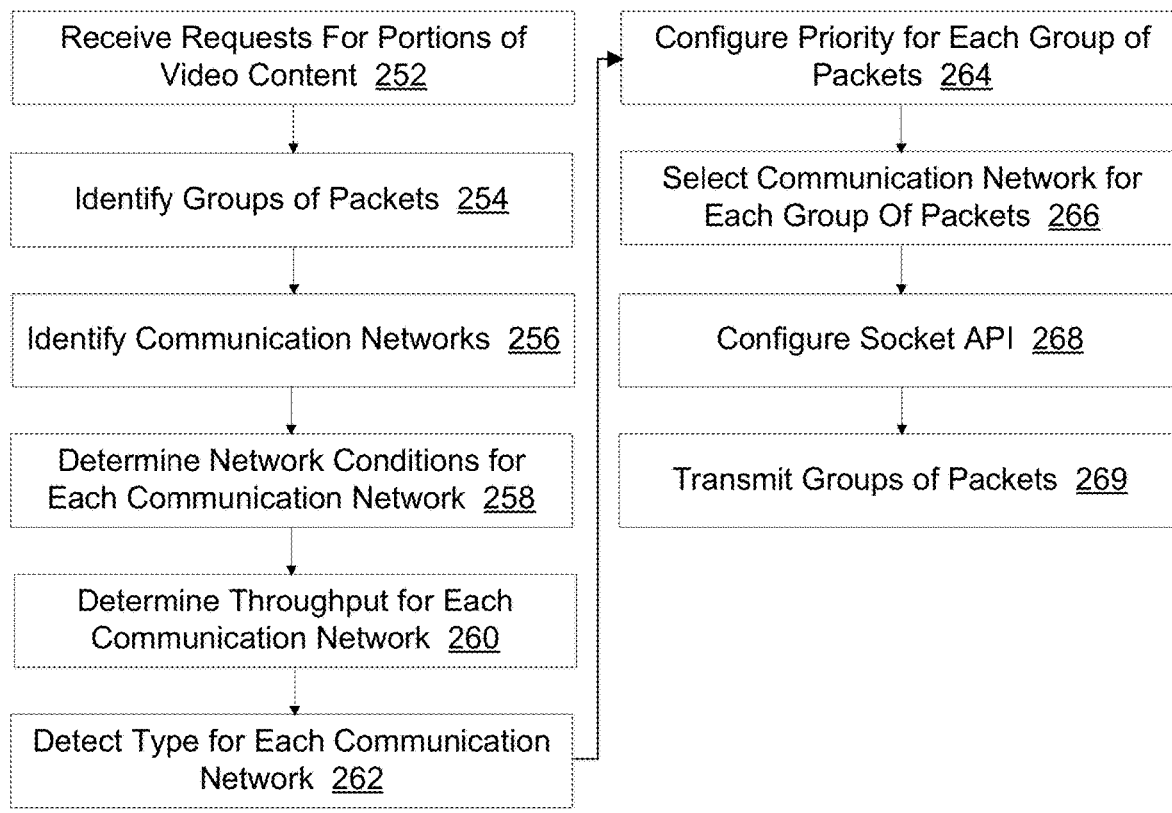
FIG. 2E depicts an illustrative embodiment of a method in accordance with various aspects described herein.

FIG. 2E depicts an illustrative embodiment of a method 250 in accordance with various aspects described herein. In one or more embodiments, method 250 can be implemented by a video content server described herein. The method 250 can include, at 252, the video content server receiving a request for a plurality of portions of video content. The receiving of the request comprises receiving the request from a client device, wherein the client device comprises a virtual reality headset. In some embodiments, the receiving of the request comprises receiving a first request for the FoV tiles for a first portion of video content, and receiving a second request for the OOS tiles for s second portion of the video content. Further, the method 250 can include, at 254, the video content server identifying a first group of packets associated with field of view (FoV) tiles for the video content in response (in some embodiments) to receiving the request and identifying a second group of packets associated with out of sight (OOS) tiles for the video content in response (in some embodiments) to receiving the request. In addition, the method 250 can include, at 256, the video content server identifying a first and second communication network from a plurality of communication networks that are capable of transmitting the first group of packets and the second group of packets.

In one or more embodiments, the method 250 can include, at 258, the video content server determining first network conditions for the first communication network and determining second network conditions for the second communication network. Further, the method 250 can include, at 260, the video content server determining a first throughput for the first communication network and determining a second throughput for the second communication network. It can be determined by the video content server that the first throughput is higher than the second throughput. In addition, the method 250 can include, at 262, the video content server detecting a first type of network for the first communication network and detecting a second type of network for the second communication network. The first type of network can comprise a cellular network and the second type of network can comprise a WiFi network.

In one or more embodiments, the method 250 can include, at 264, the video content server configuring a transmission of the first group of packets to the high priority and configuring a transmission of the second group of packets to the low priority. Further, the method 250 can include, at 266, the video content server selecting a first communication network to transmit the first group of packets and selecting a second communication network to transmit the second group of packets. In some embodiments, the selecting of the first communication network comprises selecting the first communication network to transmit the first group of packets according to the high priority and/or that a first throughput of the first communication network is higher than a second throughput of the second communication network and the selecting of the second communication network comprises selecting the second communication network to transmit the second group of packets according to the low priority and/or that the first throughput of the first communication network is higher than the second throughput of the second communication network. In other embodiments, the selecting of the first communication network comprises selecting the first communication network to transmit the first group of packets according to the high priority and/or first network conditions associated with the first communication network and the selecting of the second communication network comprises selecting the second communication network to transmit the second group of packets according to the low priority and/or second network conditions associated with the second communication network. In further embodiments, the selecting of the first communication network comprises selecting the first communication network to transmit the first group of packets according to the first type of network and the selecting of the second communication network comprises selecting the second communication network to transmit the second group of packets according to the second type of network.

In one or more embodiments, the method 250 can include, at 268, the video content server configuring a socket API for a MPTCP for the device. Configuring of the socket API includes identifying that the first group of packets are associated with the FoV tiles, associated with a high priority, and are to be transmitted over the first communication network. Configuring of the socket API includes identifying that the second group of packets are associated with the OOS tiles, associated with a low priority, and are to be transmitted over the second communication network;

Further, the method 250 can include, at 269, the video content server transmitting the first group of packets over the first communication network using MPTCP and transmitting the second group of packets over the second communication network using MPTCP. In some embodiments, the video content can comprise panoramic video content. Further, panoramic video content can be 360 degree video content or panoramic video content that is less than 360 degrees.

While for purposes of simplicity of explanation, the respective processes are shown and described as a series of blocks in FIG. 2E, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

In addition, embodiments described herein and portions thereof can be combined with other embodiments or portions thereof.

In one or more embodiments, 360-degree videos are becoming increasingly popular on commercial platforms. Embodiments described herein aim at improving the performance, resource utilization efficiency, and users' quality of experience (QoE) for 360° video streaming on commodity mobile devices. Based on a Field-of-View (FoV) guided approach that fetches only portions of a scene that users see, embodiments described herein include robust video rate adaptation with incremental chunk upgrading. Embodiments demonstrate performance of 360° video streaming system.

The predominance of video streaming in today's Internet shows no sign of weakening. In Q4 2016, mobile videos have eventually surpassed desktop videos in terms of online viewing time. Today's mobile videos are escalating in many dimensions including resolution, frame rate, codec, and in particular, the interaction method (e.g., 360° video and drone-assisted video). Such changes are fueled by multiple factors including faster mobile networks (LTE and 5G), new video types, more powerful devices, and affordable gear or accessories such as Virtual Reality (VR) headsets. Embodiments described herein explore several research directions for streaming 360° videos, also known as immersive or panoramic videos. 360° videos are expected to become 'the next frontier in mobile video." As a component of VR, they provide users with an immersive viewing experience that far exceeds what regular videos can offer. They are becoming increasingly popular on commercial platforms such as YouTube with the top videos being viewed more than 60 million times.

Maintaining good Quality of Experience (QoE) for 360° videos over bandwidth-limited links on commodity mobile devices remains challenging. First, 360° videos are large: under the same perceived quality, 360° videos have around 5× larger sizes than conventional videos. Second, 360° videos are complex: sophisticated projection and content representation schemes may incur high overhead. For example, the projection algorithm used by Oculus 360 VR headset requires servers to maintain up to 88 versions of the same video. Third, 360° videos are still under-explored: there is a lack of real-world experimental studies of key aspects such as rate adaptation, QoE metrics, and cross-layer interactions (e.g., with TCP and web protocols such as HTTP/2). Embodiments described herein include building blocks of next-generation 360° video systems that include FOV guided approach that fetches only portions of a scene users will see. A pinpointing of a fundamental mismatch between today's popular encoding schemes (e.g., H.264/AVC and H.265/HEVC) and FOV guided 360° streaming: these schemes lack the capability of incrementally upgrading a fetched portion to a higher quality. Embodiments can include a rate adaptation scheme with a "delta encoding" design that can substantially improve the adaptiveness in face of FOV prediction errors.

Big data analytics to facilitate accurate head movement prediction (HMP), a key prerequisite for FOV-guided streaming. Specifically, jointly consider several dimensions including (1) viewing statistics of the same video across users, (2) viewing behaviors over multiple videos of a single user, and (3) other contextual information such as users' poses and engagement levels. Such a "data fusion" approach provides intelligence for FOV-guided prefetching.

Figure 2F:
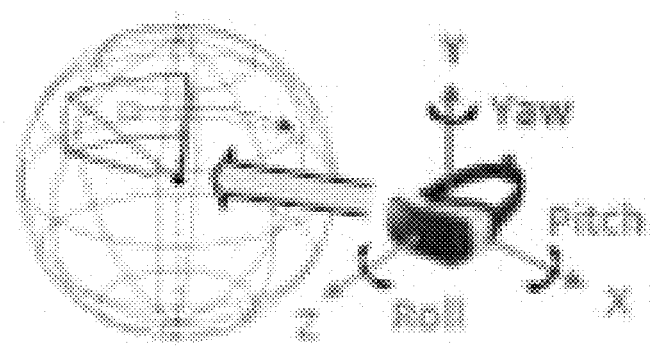

360° videos are recorded by omnidirectional cameras, which capture all 360 degrees of a scene that can be "wrapped" onto a 3D sphere. There are COTS portable omnidirectional cameras that are either standalone (e.g., Acer Holo 360° with built-in LTE) or attachable to a smartphone (e.g., Insta360). Users can watch 360° videos directly on commodity smartphones or through affordable VR devices such as a Google Cardboard. When watching a 360° video, a viewer at the center of the sphere can freely control her viewing direction by changing the pitch, yaw, and roll as shown in FIG. 2F. During a playback, in addition to performing regular video decoding, the player also needs to apply projection to render the content in the user's current FoV based on her head orientation. There are different projection algorithms such as equirectangular projection used by YouTube and Cube Map employed by Facebook. The width and height of the FoV are usually fixed parameters of a VR headset.

Today's major 360° video providers (e.g., YouTube and Facebook) employ FoV-agnostic streaming that delivers the entire panoramic view, leading to possible inefficient use of bandwidth. To play HD 360° videos smoothly over networks with limited bandwidth, FoV-guided streaming can be employed that focuses on providing high quality views within users' FoV. Described herein are two FoV-guided approaches: tiling and versioning.

Tiling can be described as follows. The 360° video is spatially segmented into tiles. Only tiles within the FoV are downloaded at high quality, whereas the remaining tiles are delivered at lower qualities or not delivered at all. It can be demonstrated via trace-driven simulations that tiling provides significant bandwidth saving (typically 45% and 60% to 80%) compared to the FoV-agnostic approach. Tiling imposes reduced load at the server while increasing the load at the client, which needs to determine the group of tiles to fetch and then stitch them together. As described herein, this approach is feasible on COTS smartphones.

The 360° video is encoded into multiple versions each having a different high-quality region; the (video) player needs to pick the appropriate version based on user's viewing direction. This approach simplifies the fetching, decoding, and rendering logic at the client's (video) player, but incurs substantial overhead at the server that needs to maintain a large number of versions of the same video (e.g., up to 88 for Oculus 360).

In the multimedia community, panoramic video generation can be from either a single camera or multiple cameras. Researchers also proposed different projection and encoding schemes. Some embodiments can include other aspects such as measurement, energy consumption, and optimization through edge computation. It is worth mentioning that the vast majority of recent mobile 360° video research is based on simulation or trace-driven emulation. Some embodiments can include a proprietary system implementation that is in early-stage, e.g., lacking components such as rate adaptation and head movement prediction. This is in sharp contrast with conventional video streaming research where many mature and open-source players and tools are available.

Figure 2G:
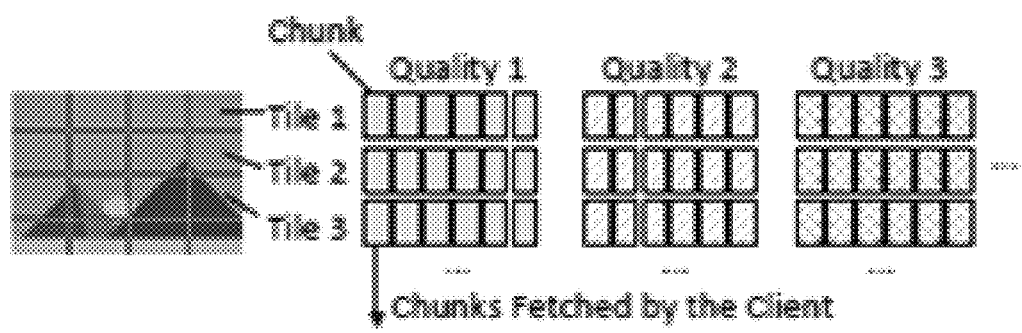

Embodiments can include developing Sperke, which is one of the techniques or environment to provide a FoV-guided adaptive mobile 360° video streaming framework. Sperke employs a tiling-based approach to avoid storing too many video versions at the server side. Sperke has three goals: (1) smooth playback based on robust head movement prediction (HMP), (2) interchangeable projection, rate adaptation, and HMP algorithms as the ones described herein, and (3) compatibility with COTS devices. As shown in FIG. 2G, Sperke follows the DASH paradigm and encodes a panoramic video into multiple qualities; each quality is spatially segmented into multiple tiles, which are then temporally split into chunks. A chunk C(q, l, t) is thus the smallest downloadable unit in Sperke where q, l, and t are the quality level, tile ID, and chunk starting time, respectively. All chunks have the same duration (e.g., one or two seconds), and are fetched by the client's (video) player based on estimated network conditions and HMP. Chunks are then decoded, projected, and rendered according to user's current FoV.

Sperke can be an "infrastructural base" upon which embodiments herein can be built and evaluated. Embodiments include several salient features and optimizations to the Sperke framework to improve its performance, resource efficiency and usability.

Multiple network interfaces (e.g., WiFi and LTE) are widely supported by today's mobile devices. Multipath transport allows applications to use multiple interfaces simultaneously. It provides new opportunities for drastically improving the mobile application performance, including video streaming. The state-of-the-art multipath solution is MPTCP. It uses a content-agnostic multipath model: the upper-layer video server application regards all available paths as a single logical path, while the multipath scheduler transparently splits the video bitstream over the actual paths. Also, it largely makes sense for a conventional non-360° video that consists of only a single stream.

Although vanilla MPTCP can be directly applied to 360° video streaming, the embodiments described herein discuss improvements to MPTCP. Tiling-based 360° video content can be naturally broken down into "substreams," each with different priorities. FIG. 2H shows two types of priorities. For spatial priority, FoV chunks are more important than OOS chunks for temporal priority. For temporal priority, "urgent chunks" are chunks that have a short playback deadline due to, for example, a correction of a previous inaccurate head motion prediction (HMP). To avoid imminent stalls, they should be assigned a higher priority than regular (non-urgent) chunks.

One or more embodiments can provide the "bitstream splitting" model of MPTCP by strategically using application knowledge to guide multipath decisions, in order to achieve better video QoE. Embodiments leverage spatial and temporal priorities in the context of 360° video streaming. Consider the spatial priority as an example. In some embodiments, there are two paths with different qualities or network conditions (loss rate, latency, etc.). One embodiment can prioritize FoV and OOS chunks over the high-quality and low-quality paths, respectively, and to deliver them in different transport-layer QoS (reliable vs. best-effort respectively). Doing so offers application-layer benefits in that it facilitates faster delivery of FoV chunks by sacrificing the quality/performance of OOS chunks—a desirable tradeoff in many cases. Multipath also provides transport-layer benefits: since all paths are now fully decoupled, issues such as cross-path out-of-order can be eliminated, leading to significant performance improvement.

Besides developing multipath strategies for 360° video content, embodiments can apply the general concept of application-assisted multipath optimization, an embodiment differing from MPTCP's content-agnostic principle, to other multimedia applications. Other embodiments can include other transport-layer primitives such as network coding to be leveraged in this context.

Figure 3:
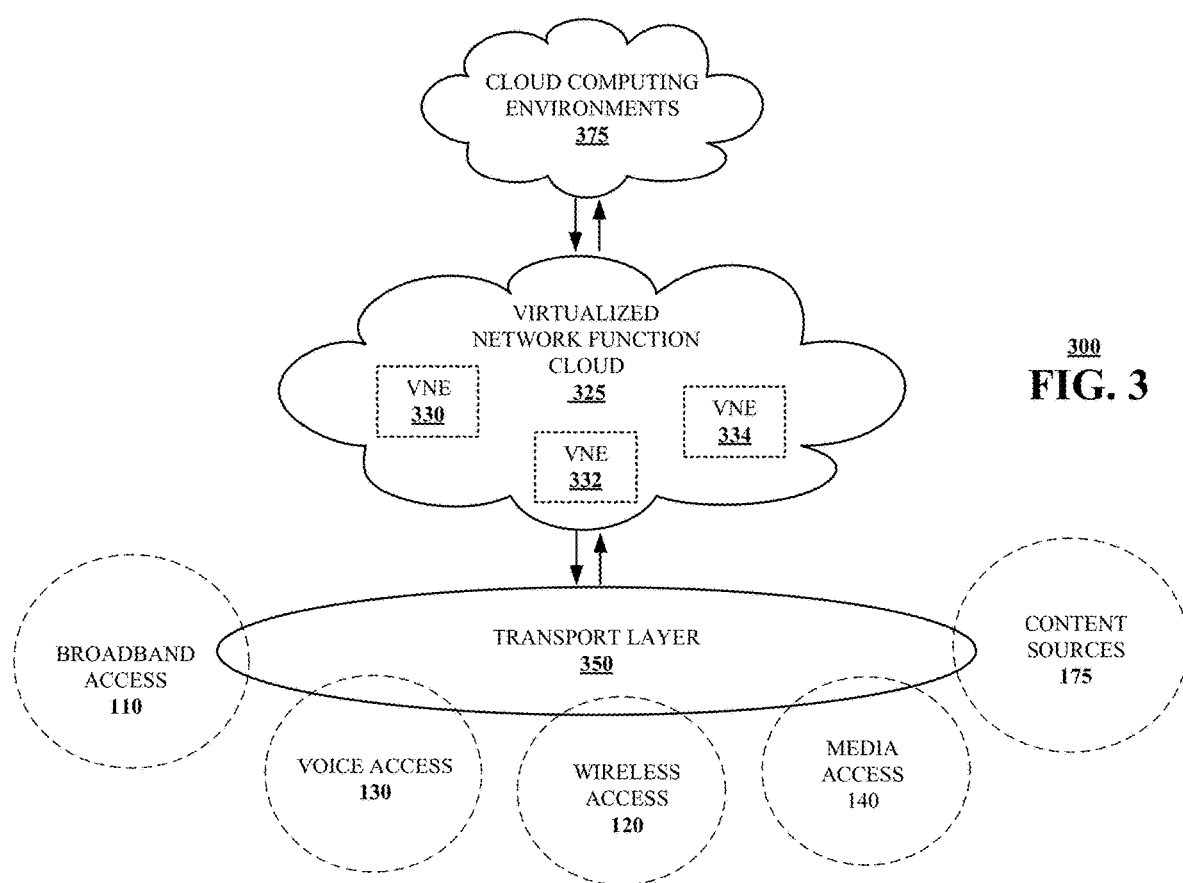
FIG. 3 is a block diagram illustrating an example, non-limiting embodiment of a virtualized communication network in accordance with various aspects described herein.

Referring now to FIG. 3, a block diagram 300 is shown illustrating an example, non-limiting embodiment of a virtualized communication network in accordance with various aspects described herein. Embodiments include providing multipath streaming of panoramic video content. That is, FoV tiles of the video content are configured with a high priority and OOS tiles of the video content are configured with a low priority. Further, a video content server provides packets associated with the FoV tiles to a client device that presents the video content over a first communication network and the video content server provides packets associated with the OOS tiles to the client device over a second communication network. The first communication network has network conditions such that it provides the packets associated with the FoV tiles faster than the packets associated with the OOS tiles over the second communication network.

In particular a virtualized communication network is presented that can be used to implement some or all of the subsystems and functions of communication network 100, the subsystems and functions of system 200, 220, 230, 240 and method 250 presented in FIGS. 1, 2A, 2B, 2C, 2D and 3.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The VNEs 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These VNEs 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
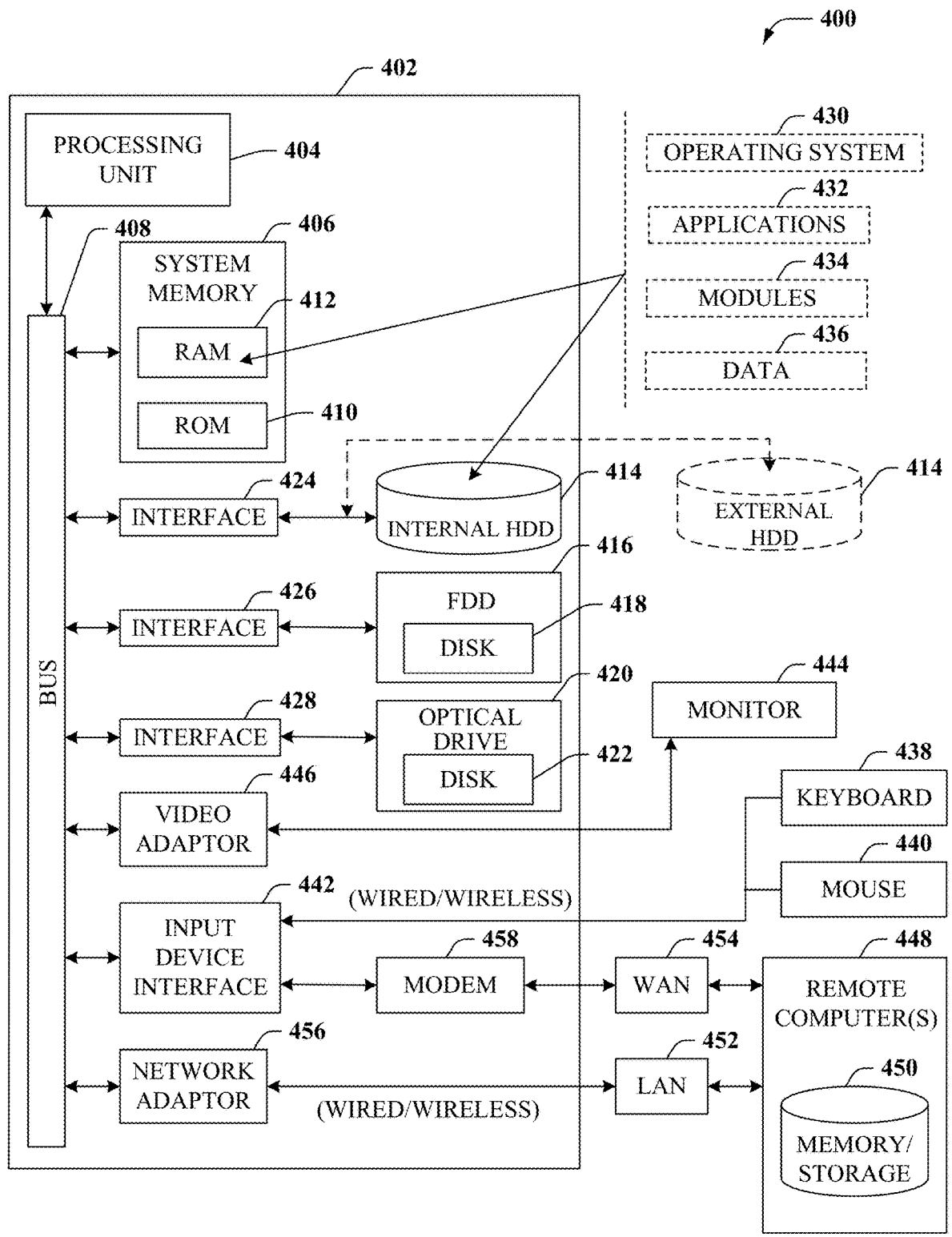
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software.

Generally, program modules comprise routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. Devices such as the video content server 202 and client device 212 can comprise the computer 402. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
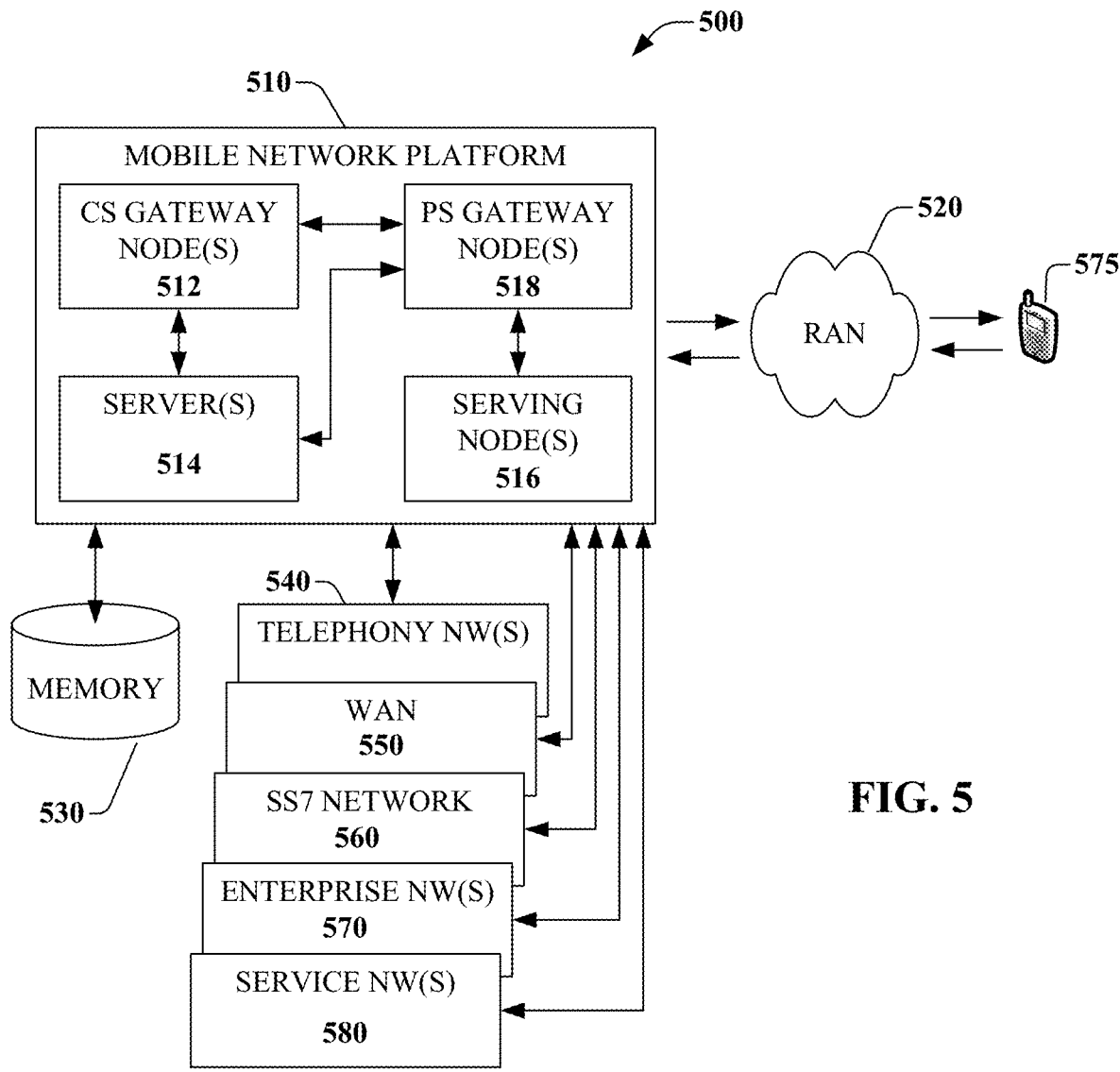
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. Embodiments include providing multipath streaming of panoramic video content. That is, FoV tiles of the video content are configured with a high priority and OOS tiles of the video content are configured with a low priority. Further, a video content server provides packets associated with the FoV tiles to a client device that presents the video content over a first communication network and the video content server provides packets associated with the OOS tiles to the client device over a second communication network. The first communication network has network conditions such that it provides the packets associated with the FoV tiles faster than the packets associated with the OOS tiles over the second communication network.

In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WAN) 550, enterprise network(s) 570, and service network(s) 580, which can be embodied in local area network(s) (LANs), can also be interfaced with mobile network platform 510 through PS gateway node(s) 518. It is to be noted that WAN 550 and enterprise network(s) 570 can embody, at least in part, a service network(s) like IP multimedia subsystem (IMS). Based on radio technology layer(s) available in technology resource(s) of radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
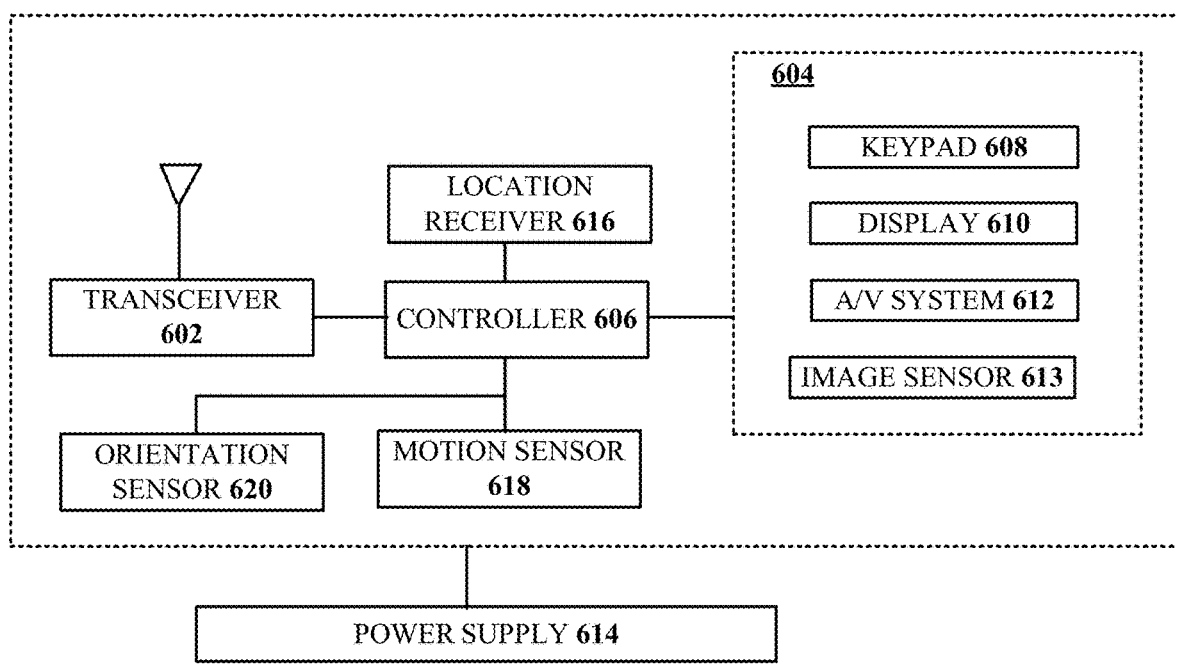
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. Further, the communication device 600 can comprise video content server 202 or client device 212.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1×, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, x=(x1, x2, x3, x4, . . . , xn), to a confidence that the input belongs to a class, that is, f(x) =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
    a processing system including a processor; and
    a memory that stores executable instructions that, when executed by the processing system, facilitate performance of operations, the operations comprising:
        receiving a request for a plurality of portions of video content;
        identifying a first group of packets associated with field of view (FoV) tiles for the video content in response to receiving the request;
        determining a spatial priority or a temporal priority for the FoV tiles;
        identifying a second group of packets associated with out of sight (OOS) tiles for the video content in response to receiving the request;
        determining a spatial priority or a temporal priority for the OOS tiles;
        selecting a first communication network to transmit the first group of packets wherein the selecting of the first communication network is based on the spatial priority or the temporal priority for the FoV tiles;
        selecting a second communication network to transmit the second group of packets, wherein the selecting of the second communication network is based on the spatial priority or the temporal priority of the OOS tiles;
        configuring a socket application programming interface (API) for a Multipath Transmission Control Protocol (MPTCP) for the device, wherein the configuring of the socket API includes identifying that the first group of packets are associated with the FoV tiles, associated with a high priority based on the spatial priority or the temporal priority for the FoV tiles, and are to be transmitted over the first communication network, wherein the configuring of the socket API includes identifying that the second group of packets are associated with the OOS tiles based on the spatial priority or the temporal priority for the OOS tiles, associated with a low priority, and are to be transmitted over the second communication network, wherein the first communication network has network conditions such that it provides the first group of packets associated with the FoV tiles faster than the second group of packets associated with the OOS tiles are provided over the second communication network;
        transmitting the first group of packets over the first communication network using MPTCP; and
        transmitting the second group of packets over the second communication network using MPTCP.

2. The device of claim 1, wherein the receiving of the request comprises:
    receiving a first request for the FoV tiles for a first portion of the video content; and
    receiving a second request for the OOS tiles for a second portion of the video content.

3. The device of claim 1, wherein the operations comprise:
    identifying the first and second communication networks from a plurality of communication networks that are capable of transmitting the first group of packets and the second group of packets.

4. The device of claim 3, wherein the operations comprise:
    determining a first throughput for the first communication network; and
    determining a second throughput for the second communication network, wherein the first throughput is higher than the second throughput.

5. The device of claim 1, wherein the operations comprise:
    configuring a transmission of the first group of packets to the high priority; and configuring a transmission of the second group of packets to the low priority.

6. The device of claim 5, wherein the selecting of the first communication network comprises selecting the first communication network to transmit the first group of packets according to the high priority and that a first throughput of the first communication network is higher than a second throughput of the second communication network, wherein the selecting of the second communication network comprises selecting the second communication network to transmit the second group of packets according to the low priority and that the first throughput of the first communication network is higher than the second throughput of the second communication network.

7. The device of claim 5, wherein the selecting of the first communication network comprises selecting the first communication network to transmit the first group of packets according to the high priority and first network conditions associated with the first communication network, wherein the selecting of the second communication network comprises selecting the second communication network to transmit the second group of packets according to the low priority and second network conditions associated with the second communication network.

8. The device of claim 1, wherein the operations comprise:
   detecting a first type of network for the first communication network; and
   detecting a second type of network for the second communication network, wherein the selecting of the first communication network comprises selecting the first communication network to transmit the first group of packets according to the first type of network, wherein the selecting of the second communication network comprises selecting the second communication network to transmit the second group of packets according to the second type of network.

9. The device of claim 8, wherein the first type of network comprises a cellular network, wherein the second type of network comprises a WiFi network.

10. The device of claim 1, wherein the video content comprises panoramic video content.

11. The device of claim 1, wherein the receiving of the request comprises receiving the request from a client device, wherein the client device comprises a virtual reality headset.

12. A non-transitory, machine-readable medium, comprising executable instructions that, when executed by a processing system including a processor, facilitate performance of operations, the operations comprising:
   transmitting a request for a plurality of portions of video content to a video content server, wherein the transmitting of the request causes the video content server to identify a first group of packets associated with field of view (FoV) tiles for the video content and to identify a second group of packets associated with out of sight (OOS) tiles for the video content, wherein the video content server configures the first group of packets to a high priority and based on a spatial priority or a temporal priority of the FoV tiles and the video server configures the second group of packets to a low priority based on a spatial priority or a temporal priority of the OOS tiles;
   receiving the first group of packets from a first communication network using a Multipath Transmission Control Protocol (MPTCP), wherein the video content server selects the first communication network to transmit the first group of packets according to the high priority and that a first throughput of the first communication network is higher than a second throughput of a second communication network, wherein the video content server configures a socket application programming interface (API) for the MPTCP for the processing system to identify that the first group of packets are associated with the FOV tiles, associated with the high priority, and are to be transmitted over the first communication network; and
   receiving the second group of packets from the second communication network using MPTCP, wherein the video content server selects the second communication network to transmit the second group of packets according to the low priority and that the first throughput of the first communication network is higher than the second throughput of the second communication network, wherein the video content server configures the socket API for MPTCP to identify that the second group of packets are associated with the OOS tiles, associated with the low priority, and are to be transmitted over the second communication network.

13. The non-transitory, machine-readable medium of claim 12, wherein the transmitting the request comprises:
   transmitting a first request for the FoV tiles for a first portion of video content; and
   transmitting a second request for the OOS tiles for a second portion of the video content.

14. The non-transitory, machine-readable medium of claim 12, wherein the video content server identifies the first and second communication networks from a plurality of communication networks that are capable of transmitting the first group of packets and the second group of packets.

15. The non-transitory, machine-readable medium of claim 12, wherein the video content server determines the first throughput for the first communication network and determines the second throughput for the second communication network.

16. The non-transitory, machine-readable medium of claim 12, wherein the video content server selecting the first communication network comprises selecting the first communication network to transmit the first group of packets according to the high priority and first network conditions associated with the first communication network, wherein the video content server selecting the second communication network comprises selecting the second communication network to transmit the second group of packets according to the low priority and second network conditions associated with the second communication network.

17. The non-transitory, machine-readable medium of claim 12, wherein video content server detects a first type of network for the first communication network, wherein the video content server detects a second type of network for the second communication network, wherein the video content server selecting of the first communication network comprises selecting the first communication network to transmit the first group of packets according to the first type of network, wherein the video content server selecting of the second communication network comprises selecting the second communication network to transmit the second group of packets according to the second type of network.

18. The non-transitory, machine-readable medium of claim 17, wherein the first type of network comprises a cellular network, wherein the second type of network comprises a WiFi network.

19. The non-transitory, machine-readable medium of claim 12, wherein the video content comprises panoramic video content.

20. A method, comprising:
- receiving, by a processing system including a processor, a request for a plurality of portions of video content;
- identifying, by the processing system, a first group of packets associated with field of view (FoV) tiles for the video content in response to receiving the request;
- determining a spatial priority or a temporal priority for the FoV tiles;
- identifying, by the processing system, a second group of packets associated with out of sight (OOS) tiles for the video content in response to receiving the request;
- determining a spatial priority or a temporal priority for the OOS tiles;
- configuring, by the processing system, the first group of packets to a high priority based on the spatial priority or the temporal priority for the FoV tiles and configuring, by the processing system, the second group of packets to a low priority based on the spatial priority or the temporal priority of the OOS tiles;
- selecting, by the processing system, a first communication network to transmit the first group of packets according to the high priority and first network conditions associated with the first communication network;
- selecting, by the processing system, a second communication network to transmit the second group of packets according to the low priority and second network conditions associated with the second communication network;
- configuring, by the processing system, a socket application programming interface (API) for a Multipath Transmission Control Protocol (MPTCP) for the processing system, wherein the configuring of the socket API to identify the first group of packets are associated with the FoV tiles, associated with the high priority, and to be transmitted over the first communication network, wherein the configuring of the socket API includes identifying the second group of packets are associated with the OOS tiles, associated with the low priority, and to be transmitted over the second communication network;
- transmitting, by the processing system, the first group of packets over the first communication network using MPTCP; and
- transmitting, by the processing system, the second group of packets over the second communication network using MPTCP.

* * * * *